United States Patent
Han et al.

(10) Patent No.: US 9,602,688 B2
(45) Date of Patent: Mar. 21, 2017

(54) MEDIUM SENSING APPARATUS AND FINANCIAL DEVICE FOR IDENTIFYING AUTHENTICITY OF MEDIA USING A CONTACT IMAGE SENSOR

(71) Applicant: LG N-SYS INC., Seoul (KR)

(72) Inventors: Ji Hoon Han, Seoul (KR); Bok Nam Jeong, Bucheon-si (KR)

(73) Assignee: LG CNS CO., LTD.., Seoul (KR)

( * ) Notice: Subject to any disclaimer, the term of this patent is extended or adjusted under 35 U.S.C. 154(b) by 345 days.

(21) Appl. No.: 13/768,660

(22) Filed: Feb. 15, 2013

(65) Prior Publication Data

US 2013/0214132 A1   Aug. 22, 2013

(30) Foreign Application Priority Data

Feb. 16, 2012   (KR) .................. 10-2012-0015590

(51) Int. Cl.
*G01N 21/86* (2006.01)
*H04N 1/00* (2006.01)
*G07D 7/12* (2016.01)

(52) U.S. Cl.
CPC ......... *H04N 1/00519* (2013.01); *G07D 7/121* (2013.01)

(58) Field of Classification Search
CPC .......... G07D 7/121; G07D 7/12; G07D 7/128; H04N 1/203; H04N 1/2032; H04N 1/2034
USPC .............. 250/559.4, 559.46, 559.41, 559.42
See application file for complete search history.

(56) References Cited

U.S. PATENT DOCUMENTS

| | | | |
|---|---|---|---|
| 6,147,778 A * | 11/2000 | Yamada et al. ............... 358/474 |
| 7,616,296 B2 | 11/2009 | Fujimoto et al. |
| 8,401,268 B1 * | 3/2013 | Yacoubian et al. ........... 382/135 |
| 2003/0231360 A1 * | 12/2003 | Jo ................................. 358/500 |
| 2004/0223147 A1 * | 11/2004 | Fujimoto et al. .......... 356/239.1 |
| 2007/0216976 A1 * | 9/2007 | Endo et al. ....................... 359/2 |
| 2008/0173832 A1 * | 7/2008 | Chien et al. .................. 250/556 |
| 2010/0181162 A1 | 7/2010 | Nagami et al. |

FOREIGN PATENT DOCUMENTS

| CN | 1551039 A | 12/2004 |
|---|---|---|
| CN | 101782975 A | 7/2010 |

(Continued)

OTHER PUBLICATIONS

Notice of Allowance dated Dec. 26, 2013, in Korean Application No. 10-2012-0015590, filed Feb. 16, 2012.

(Continued)

*Primary Examiner* — Thanh Luu
(74) *Attorney, Agent, or Firm* — Saliwanchik, Lloyd & Eisenchenk

(57) ABSTRACT

Provided is a medium sensing apparatus. The medium sensing apparatus comprises a first frame disposed on a transfer path of a medium, the first frame having a plurality of first sensor grooves, a second frame facing the first frame, the second frame having a plurality of second sensor grooves, a plurality of first contact image sensors disposed in the plurality of first sensor grooves, respectively, and a plurality of second contact image sensors disposed in the plurality of second sensor grooves, respectively. At least one of the plurality of first sensor grooves and at least one of the plurality of second sensor grooves are disposed to partially overlap with each other.

13 Claims, 4 Drawing Sheets

(56) References Cited

FOREIGN PATENT DOCUMENTS

| | | |
|---|---|---|
| CN | 101799951 A | 8/2010 |
| CN | 201859499 U | 6/2011 |
| CN | 2018659498 U | 6/2011 |
| JP | H02-167402 A | 6/1990 |
| JP | H08-147524 A | 6/1996 |
| JP | 2009-002830 A | 1/2009 |
| JP | 2009-157504 A | 7/2009 |

OTHER PUBLICATIONS

Office Action dated Oct. 14, 2014 in Chinese Application No. 201310051186.9.

* cited by examiner

MEDIUM SENSING APPARATUS AND FINANCIAL DEVICE FOR IDENTIFYING AUTHENTICITY OF MEDIA USING A CONTACT IMAGE SENSOR

CROSS-REFERENCE TO RELATED APPLICATION

This application claims the benefit under 35 U.S.C. §119 of Korean Patent Application No. 10-2012-0015590, filed Feb. 16, 2012, which is hereby incorporated by reference in its entirety.

BACKGROUND

The present disclosure relates to a medium sensing apparatus and a financial device.

In general, financial devices are devices for automatically processing financial business desired by customers. The financial devices may deposit or withdraw media (for example, paper moneys, checks, securities, gift certificates, and the like) or automatically transfer the media.

Such a financial device comprises a medium storage box for storing media. Here, the medium storage box comprises a cassette, a recovery part in which an abnormal medium is stored, and a temporary storage apparatus for temporarily storing a medium that is put in through a medium entrance.

The financial device needs to identify whether a put-in or taken-out medium is a forged medium, if not, what kinds of medium are put in or taken out. If the forged medium is put in, the forged medium is retransferred to the customer. If not, the medium is adequately put in the cassette for each kind.

Thus, the financial device according to the related art senses media by using a contact image sensor (CIS) scanning manner in which light is emitted close to a surface of a medium to sense the medium. Here, the CIS may be a reflective CIS which reflects light against a surface of a medium to identify the medium by using the reflected image or a transmissive CIS which transmits light through a surface of a medium to identify the medium by using an overlap image of front and rear surfaces of the medium.

However, since the financial device according to the related art has an internal frame structure that is suitable for only one of the reflective CIS and the transmissive CIS, it is substantially impossible to change a kind of CIS.

BRIEF SUMMARY

Embodiments provide a medium sensing apparatus and a financial device.

In one embodiment, a medium sensing apparatus comprises: a first frame disposed on a transfer path of a medium, the first frame having a plurality of first sensor grooves; a second frame facing the first frame, the second frame having a plurality of second sensor grooves; a plurality of first contact image sensors disposed in the plurality of first sensor grooves, respectively; and a plurality of second contact image sensors disposed in the plurality of second sensor grooves, respectively, wherein at least one of the plurality of first sensor grooves and at least one of the plurality of second sensor grooves are disposed to partially overlap with each other.

In another embodiment, a medium sensing apparatus comprises: a first frame disposed on a transfer path of a medium, the first frame having a first sensor groove; a second frame facing the first frame, the second frame having a second sensor groove; a first contact image sensor disposed in the first sensor groove; and a second contact image sensor disposed in the second sensor groove, wherein the first contact image sensor and the second contact image sensor are disposed to partially overlap with each other.

In further another embodiment, a financial device comprises: a main body; and a medium sensing apparatus comprising a frame disposed within the main body, the frame having a plurality of sensor grooves, and a contact image sensor inserted into each of the sensor grooves, wherein the plurality of sensor grooves comprises: a first sensor groove formed above the medium and a second sensor groove formed below the medium, wherein the first and second sensor grooves are disposed to partially overlap with each other.

The details of one or more embodiments are set forth in the accompanying drawings and the description below. Other features will be apparent from the description and drawings, and from the claims.

DETAILED DESCRIPTION

Figure 1:
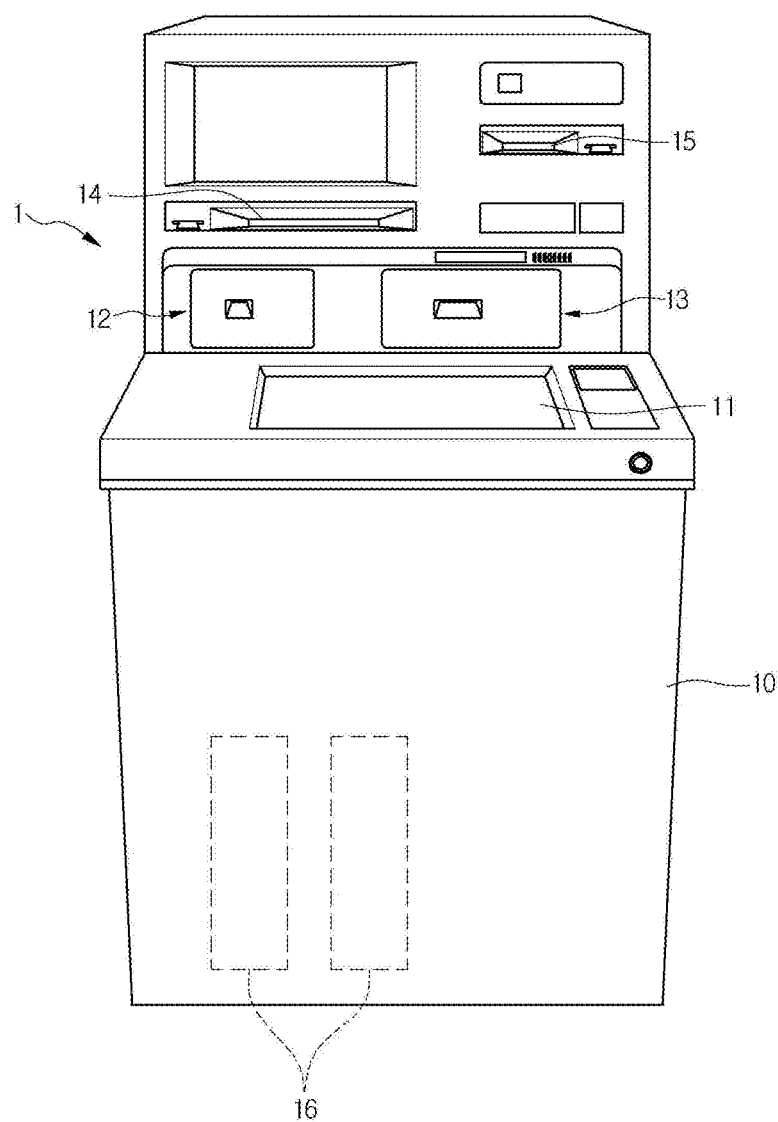
FIG. 1 is a perspective view of a financial device according to an embodiment.

Hereinafter, exemplary embodiments of the present disclosure will be described with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

A financial device according to embodiments is a device that performs financial businesses, i.e., medium processing comprising processing such as deposit processing, giro receipt, or gift certificate exchange and/or processing such as withdrawal processing, giro dispensing, or gift certificate dispensing by receiving various media such as, e.g., paper moneys, bills, giros, coins, gift certificates, etc. For example, the financial device may comprise an automatic teller machine (ATM) such as a cash dispenser (CD) or a cash recycling device. However, the financial device is not limited to the above-described examples. For example, the financial device may be a device for automatically performing the financial businesses such as a financial information system (FIS).

Hereinafter, assuming that the financial device is the ATM, an embodiment will be described. However, this assumption is merely for convenience of description, and technical idea of the present disclosure is not limited to the ATM.

FIG. 1 is a perspective view of a financial device according to an embodiment.

Referring to FIG. 1, a financial device 1 according to an embodiment comprises a main body 10 in which a plurality of parts are accommodated. The main body 10 may comprise an input part 11 for inputting a command to allow a user to process financial business, a check entrance 12 through which a check is put in and taken out, a paper money entrance 13 through which a paper money is put in and taken out, a bankbook entrance 14 through which a bankbook is put in and taken out, a card entrance 15 through which an integrated circuit (IC) card for a financial process is put in and taken out, a medium storage part 16 for storing a medium deposited through the medium entrances 12 and 13, and a medium sensing apparatus (see reference numeral 20 of FIG. 2) for sensing a medium.

In the current embodiment, at least one of the check entrance 12, the paper money entrance 13, the bankbook entrance 14, and the card entrance 15 may be omitted. The check entrance 12 and the paper money entrance 13 may be commonly called the medium entrances 12 and 13.

The medium storage part 16 may be a comprehensive concept comprising all of modules, which are disposed within the financial device 1 to put and store a medium therein, such as a temporary storage part (not shown) for temporarily storing the medium put in by a user, a recycle-box (not shown) for storing a deposited medium, a recovery part (not shown) for an abnormal medium, a cassette (not shown) for a medium.

The medium sensing apparatus (see reference numeral 20 of FIG. 2) is disposed within the main body 10 to sense a medium. The medium sensing apparatus (see reference numeral 20 of FIG. 2) will be described in detail with reference to FIGS. 2 to 8.

Figure 2:
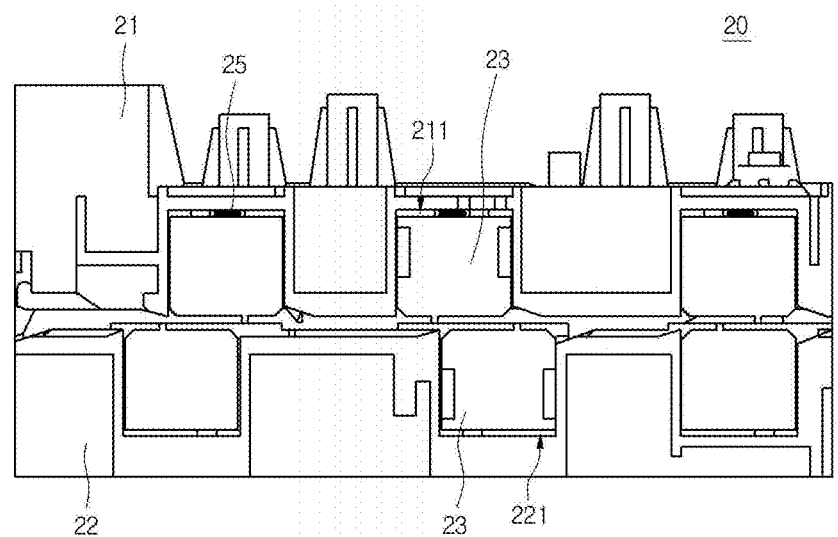
FIGS. 2 and 3 are side views of a medium sensing apparatus according to an embodiment.
Figure 3:
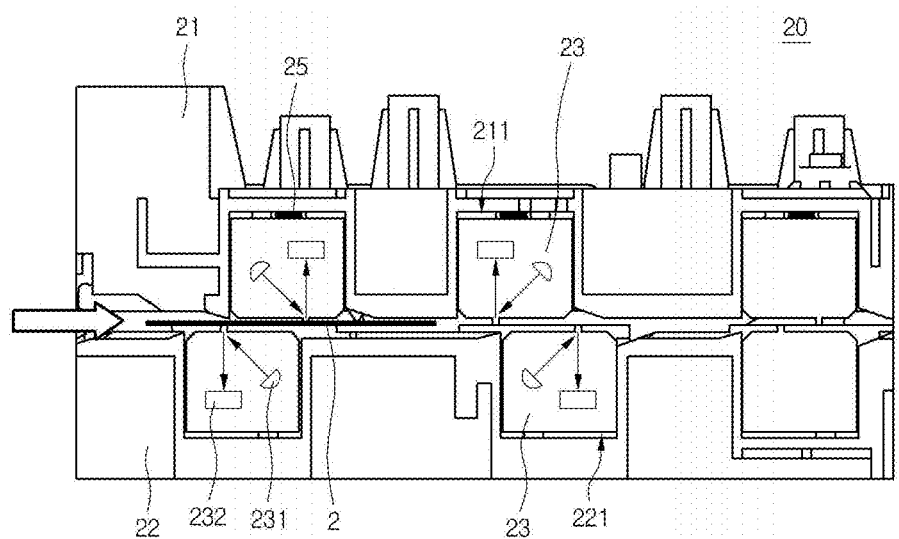

FIGS. 2 and 3 are side views of a medium sensing apparatus according to an embodiment. FIG. 2 is a view illustrating an outer appearance of a reflective contact image sensor (CIS), and FIG. 3 is a view illustrating the inside of the reflective CIS.

Referring to FIGS. 2 and 3, the medium sensing apparatus according to an embodiment comprises a first frame 21, a second frame 22, and a reflective CIS 23.

The first frame 21 is disposed on a transfer path of a medium 2. Also, the first frame 21 has a plurality of first sensor grooves 211 in which the reflective CIS 23 is inserted. The first frame 21 may be rotatably disposed with respect to the second frame 22 that will be described later.

In the current embodiment, the reflective CIS 23 disposed in the first sensor groove 211 may be easily replaced by rotating the first frame 21 to open a space between the first and second frames 21 and 22.

Here, the reflective CIS 23 disposed in the first sensor groove 211 may be minutely movable in a vertical direction. Thus, when the first frame 21 is rotated to contact the second frame 22, the reflective CIS 23 disposed in the first sensor groove 211 and a reflective CIS 23 disposed in a second sensor groove 221 may be aligned with each other at a position at which a transferred medium 2 is accurately sensed. The above-described structure will be described later.

The second frame 22 is disposed on a position corresponding to that of the first frame 21. Also, the second frame 22 has a plurality of second sensor grooves 221 in which the reflective CIS 23 is inserted. The medium 2 is transferred between the first frame 21 and the second frame 22. Here, the reflective CIS 23 may scan the medium 2 to confirm whether the medium 2 is authentic, a kind or serial number of medium 2, and the like.

The plurality of first sensor grooves 211 may be disposed spaced apart from the medium 2 in a direction parallel to a transfer direction of the medium 2. Also, the plurality of second sensor grooves 221 may be disposed spaced apart from the medium 2 in a direction parallel to the transfer direction of the medium 2.

At least one of the plurality of first sensor grooves 211 defined in the first frame 21 may partially overlap with at least one of the plurality of second sensor grooves 221 defined in the second frame 22. Also, the remaining portions may be disposed cornerwise with respect to each other so that the portions do not overlap with each other.

That is, when the first and second frames 21 and 22 overlap with each other, the first and second sensor grooves 211 and 221 may contact each other, but portions of the first and second sensor grooves may be disposed cornerwise. This is done for utilizing all of the reflective CIS 23 and a transmissive CIS (see reference numeral 26 of FIG. 7) in the current embodiment.

The first sensor groove and the second sensor groove are disposed so that each light emitting from the light emitting parts of the first contact image sensor and the second contact image sensor reflect to the light receiving parts of the first contact image sensor and the second contact image sensor respectively.

Here, portions of the first and second sensor grooves 211 and 221 of the plurality of sensor grooves 211 and 221 may disposed to partially overlap with each other, and the remaining portions of the first and second sensor grooves 211 and 221 may be disposed to entirely overlap with each other.

That is, for example, when each of the first and second sensor grooves is provided in three, two first second sensor grooves 211 and two second sensor grooves 221 which close in the put-in direction of the medium 2 may be disposed to partially overlap with each other. Also, one first sensor groove 211 and one second sensor groove 221 which are far away in the put-in direction of the medium 2 may be disposed to entirely overlap with each other.

In the current embodiment, the first frame 21 may be an upper frame disposed above the medium 2, and the second frame 22 may be a lower frame disposed below the medium 2. Also, the first sensor groove 211 may be an upper sensor groove defined above the medium 2, and the second sensor groove 221 may be a lower sensor groove defined below the medium 2.

The reflective CIS 23 may be provided in plural. Also, the reflective CIS 23 is inserted into the first and second sensor grooves 211 and 221 to emit light onto the medium 2, thereby scanning the medium 2. Particularly, the reflective CIS 23 reflects light from a surface of the medium 2 to identify the medium 2 by using the reflected image.

For this, the reflective CIS 23 may comprise a light emitting part 231 emitting light onto the surface of the medium 2 and a light receiving part 232 receiving the light reflected from the surface of the medium 2.

The light emitting part 231 may vertically or inclinedly emit light onto the surface of the medium 2. The light receiving part 232 may receive the light reflected from the surface of the medium 2 at an angle inclined with respect to the surface of the medium 2. This is possible because the light emitted from the light emitting part 231 is diffused.

The reflective CIS 23 inserted into the first sensor groove 211 may be point symmetry to the reflective CIS 23 inserted into the second sensor groove 221 corresponding to the first sensor groove 211 with respect to the side view of FIG. 3 or a section of each sensor 23 (or each sensor groove). Here, a symmetric reference point may be one point of the transfer path of the medium 2.

That is, a pair of reflective CISs 23 may be disposed in one first sensor groove 211 and one second sensor groove 221 corresponding to the one first sensor groove 21 so that the light emitting parts 231 of the reflective CISs 23 do not overlap with each other in a direction perpendicular to the transfer path of the medium 2.

This is done for a reason in which light emitted from the light emitting part 231 of the reflective CIS 23 disposed in the first sensor groove 211 does not have an influence on the light emitted from the light emitting part 231 of the reflective CIS 23 disposed in the second sensor groove 221 to secure an accurate identification of the medium 2.

That is, in the current embodiment, the first and second sensor grooves 211 and 221 may be disposed to partially overlap with each other. Here, the light emitting part 231 of the reflective CIS 23 of the first sensor groove 211 and the light emitting part 231 of the reflective CIS 23 of the second sensor groove 221 may not have an influence on each other. This is possible because the first sensor groove 211 (or the reflective CIS of the first sensor groove 211) and the second sensor groove 221 (or the reflective CIS of the second sensor groove 221) are disposed to partially overlap with each other.

Also, the reflective CIS 23 may be disposed in each of one first sensor groove 211 and a next first sensor groove 211 disposed in the put-in direction of the medium 2. Here, the light emitting parts 231 and the light receiving parts 232 of the two reflective CISs 23 may be may be disposed in directions opposite to each other.

That is, the reflective CISs disposed in each of the two adjacent first sensor grooves 211 or second sensor grooves 221 may be disposed axisymmetrically to each other with respect to the side view of FIG. 3 or the section of each sensor 23 (or each sensor groove).

Figure 4:
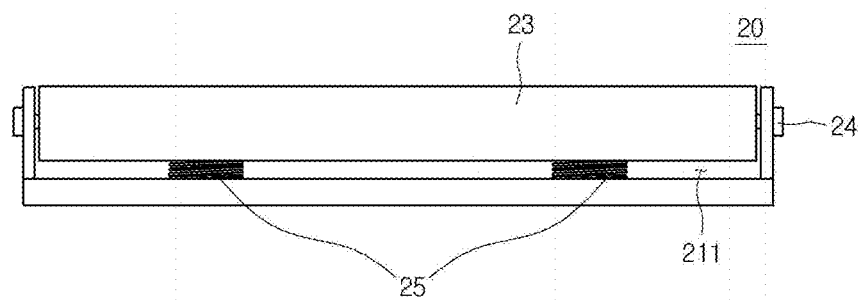
FIG. 4 is a cross-sectional view of the medium sensing apparatus according to an embodiment.
Figure 5:
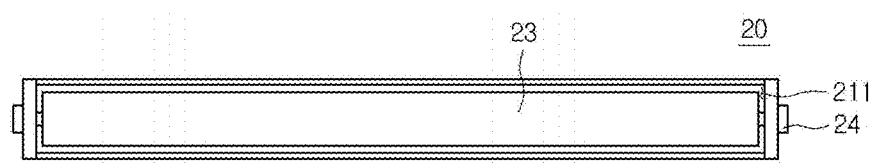
FIG. 5 is a plan view of the medium sensing apparatus according to an embodiment.
Figure 6:
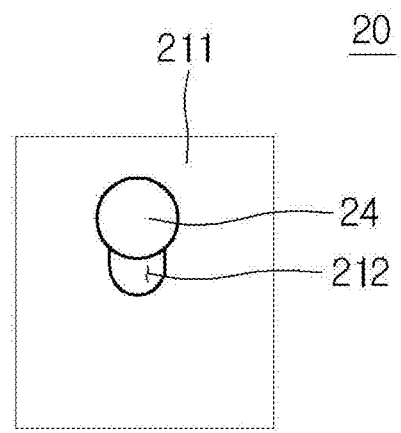
FIG. 6 is a side view of the medium sensing apparatus according to an embodiment.

FIG. 4 is a cross-sectional view of the medium sensing apparatus according to an embodiment. FIG. 5 is a plan view of the medium sensing apparatus according to an embodiment. FIG. 6 is a side view of the medium sensing apparatus according to an embodiment.

Referring to FIGS. 4 to 6, the medium sensing apparatus 20 according to an embodiment may further comprise a coupling hole 212, a fixing member 24, and an elastic member 25.

The coupling hole 212 may be defined in each of both sides of the sensor grooves 211 and 221. Here, the coupling hole 212 may have a size enough that the fixing member 24 is minutely movable. Thus, the reflective CIS 23 inserted into the sensor grooves 211 and 221 may be minutely moved in a vertical direction. Also, since an elastic force due to the elastic member 25 is continuously applied into the reflective CIS 23, the reflective CIS 23 may scan the surface of the medium 2 in a state where the reflective CIS 23 is in contact with the transferred medium 2.

The fixing member 24 passes through the coupling hole 212 and then is coupled to the reflective CIS 23. The fixing member 24 may be coupled to both sides of the reflective CIS 23. A bolt may be used as the fixing member 24. That is, one end of the fixing member 24 exposed to the outside of the sensor grooves 211 and 221 may have a size that does not pass through the coupling hole 212. On the other hand, one end of the fixing member 24 inserted into the sensor grooves 211 and 221 may have a size that sufficiently passes through the coupling hole 212. The fixing member 24 may be moved within the coupling hole 212 in a direction crossing the transfer path of the medium.

The elastic member 25 is disposed on surface of the reflective CIS 23. The elastic member 25 may provide an elastic force to the reflective CIS 23 in a direction in which the reflective CIS 23 is in contact with the medium 2.

The coupling hole 212, the fixing member 24, and the elastic member 25 may be provided on only the first frame 21. That is, the reflective CIS 23 inserted into the second sensor groove 221 of the second frame 22 may be fixed in position. On the other hand, the reflective CIS 23 inserted into the first sensor groove 211 of the first frame 21 may vary in position.

Thus, in the current embodiment, when the first frame 21 may rotate to overlap with the second frame 22, the reflective CIS 23 inserted into the first sensor groove 211 may be minutely moved. Thereafter, when the first and second frames 21 and 22 is completely coupled to each other, the reflective CIS 23 inserted into the first sensor groove 211 may return its original position.

Thus, in the current embodiment, the pair of reflective CISs 23 disposed in the first and second sensor grooves 211 and 221 may be disposed on positions at which the reflective CISs 23 may smoothly identify the medium 2 regardless of the rotation of the first frame 21.

Here, a case in which the rotation of the first frame 21 is needed may represent a case in which the reflective CIS 23 is replaced, a case in which the medium 2 remaining between the first and second frames 21 and 22 is removed, or a case in which the transfer path of the medium is opened due to other causes.

Figure 7:
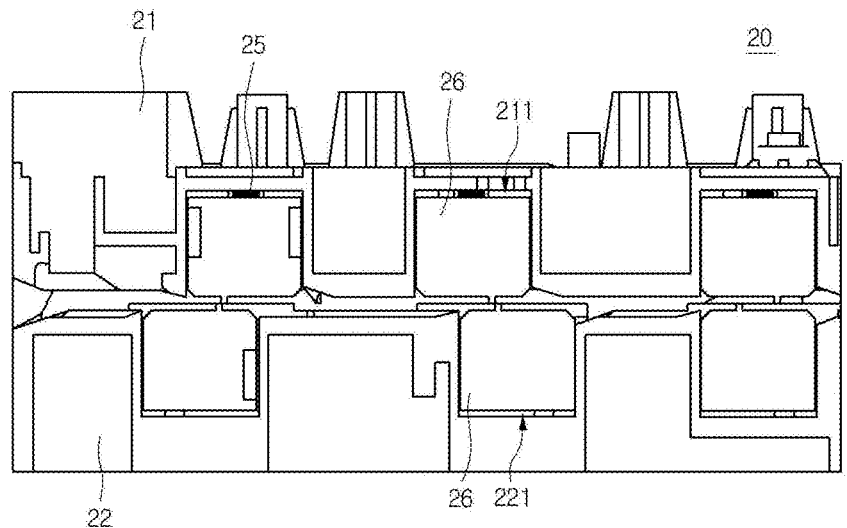
FIGS. 7 and 8 are side views of a medium sensing apparatus according to another embodiment.
Figure 8:
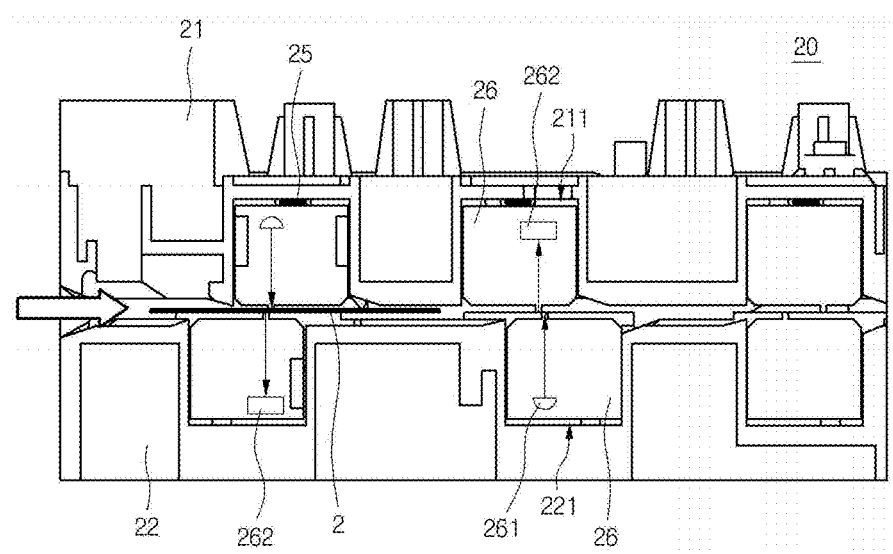

FIGS. 7 and 8 are side views of a medium sensing apparatus according to another embodiment. Here, FIG. 7 is a view illustrating an outer appearance of a transmissive CIS, and FIG. 8 is a view illustrating the inside of the transmissive CIS.

Referring to FIGS. 7 and 8, a medium sensing apparatus according to another embodiment comprises a first frame 21, a second frame 22, and a transmissive CIS 26.

When compared to the foregoing embodiment, the current embodiment is the same as the foregoing embodiment except for a kind of CISs 23 and 26. That is, the current embodiment may have the same structure as the foregoing embodiment in the frames 21 and 22, a fixing member 24, and an elastic member 25. Thus, descriptions with respect to remaining parts except for the transmissive CIS 26 will be omitted in the current embodiment.

Like the reflective CIS 23 according to the foregoing embodiment, the transmissive CIS 26 may be inserted into first and second sensor grooves 211 and 221 to emit light onto a medium 2, thereby scanning the medium 2.

Here, the transmissive CIS 26 may transmits light through the surface of the medium 2 to identify the medium 2 by using an overlap image of front and rear surfaces of the medium 2. That is, for example, when light is emitted from a lower side (or an upper side) of the medium 2 to receive the light passing through the medium 2 at the upper side (or the lower side) of the medium 2, the received light may pass through the front and rear surfaces of the medium 2. Thus, an image scanned by the transmissive CIS 26 may be an image in which images of the front and rear surfaces of the medium 2 overlap with each other.

The transmissive CIS 26 may comprise one of a light emitting part 261 emitting light and a light receiving part 262 receiving light. That is, the transmissive CIS 26 may be classified into a transmissive CIS 26 comprising the light emitting part 261 and a transmissive CIS 26 comprising the light emitting part 262. Here, the light emitting part 261 and the light receiving part 262 may be disposed biased to a side of the inside of the transmissive CIS 26 and also disposed to face each other.

That is, the transmissive CIS 26 inserted into the first sensor hole 211 may be point symmetry to the transmissive CIS 26 inserted into the second sensor hole 221 corresponding to the first sensor hole 211.

Also, if the first sensor groove 211 is exemplified, the transmissive CIS 26 comprising the light emitting part 261 may be disposed in one first sensor groove 211, and the transmissive CIS 26 comprising the light receiving part 262 may be disposed in the next first sensor groove 211 with respect to a put-in direction of the medium 2.

The disposition of the transmissive CIS 26 in the first sensor groove 211 may be opposite to that of the transmissive CIS 26 in the second sensor groove 221. This is done because, when the transmissive CIS 26 inserted into the first sensor groove 211 comprises the light emitting part 261, the transmissive CIS 26 inserted into the second sensor groove 221 corresponding to the first sensor groove 211 should comprise the light receiving part 262. However, even though the light emitting part 261 and the light receiving part 262 are not disposed parallel to each other, since light emitted from the light emitting part 261 may reach the light receiving part 262, the medium 2 may be easily identified in the current embodiment.

The frames 21 and 22 according to the current embodiment may be equal to those 21 and 22 according to the foregoing embodiment. That is, even though the frames 21 and 22 are not changed in structure, all of the reflective CIS 23 and the transmissive CIS 26 may be used in the embodiments.

Thus, since the reflective CIS 23 and the transmissive CIS 26 may be selectively used by using one frame 21 or 22, the medium sensing apparatus may be easily changed in structure to improve user's satisfaction.

In the embodiments, the reflective CIS 23 disposed in the first sensor groove 211 may be called a first reflective CIS. Also, the reflective CIS 23 disposed in the second sensor groove 221 may be called a second reflective CIS.

Also, the transmissive CIS 26 disposed in the first sensor grove 211 may be called a first transmissive CIS, and the transmissive CIS 26 disposed in the second sensor groove 221 may be called a second transmissive CIS.

In the embodiments, the disposition of the first and second sensor grooves or the disposition of the CIS of the first sensor groove and the ICS of the second sensor groove may be equally applied also in a case in which only one sensor groove is defined in each of the frames.

Even though all the elements of the embodiments are coupled into one or operated in the combined state, the present disclosure is not limited to such an embodiment. That is, all the elements may be selectively combined with each other without departing the scope of the invention.

Furthermore, when it is described that one comprises (or comprises or has) some elements, it should be understood that it may comprise (or comprise or has) only those elements, or it may comprise (or comprise or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

What is claimed is:

1. A medium sensing apparatus comprising:
   single first frame disposed on a transfer path of a medium, the single first frame having a plurality of first sensor grooves, wherein a first contact image sensor is insertable in each of the plurality of first sensor grooves, the first contact image sensor being a reflective contact image sensor or a transmissive contact image sensor, the plurality of first sensor grooves being arranged to be spaced apart from each other in a transfer direction of the medium;
   single second frame facing the single first frame, the single second frame having a plurality of second sensor grooves, wherein a second contact image sensor is insertable in each of the plurality of second sensor grooves, the second contact image sensor being a reflective contact image sensor or a transmissive contact image sensor, the plurality of second sensor grooves being arranged to be spaced apart from each other in the transfer direction of the medium;
   a plurality of first contact image sensors disposed in the plurality of first sensor grooves, respectively; and
   a plurality of second contact image sensors disposed in the plurality of second sensor grooves, respectively;
   wherein at least one of the plurality of first sensor grooves and at least one of the plurality of second sensor grooves are disposed to partially overlap with each other, and
   wherein a distance between two adjacent first sensor grooves of the plurality of first sensor grooves is different from a distance between two adjacent second sensor grooves of the plurality of second sensor grooves.

2. The medium sensing apparatus of claim 1, wherein one or more of the plurality of first sensor grooves and one or more of the plurality of second sensor grooves are disposed to partially overlap with each other, and
   the others of the plurality of first sensor grooves and the others of the plurality of second sensor grooves are disposed to entirely overlap with each other.

3. The medium sensing apparatus of claim 1, wherein at least one first contact image sensor disposed in at least one first sensor groove is point symmetric to at least one second contact image sensor disposed in at least one second sensor groove overlapping with the at least one first sensor groove.

4. The medium sensing apparatus of claim 1,
wherein when the plurality of first contact image sensors and the plurality of second contact image sensors are reflective contact image sensors, light emitted from light emitting parts of the first contact image sensor and the second contact image sensor is reflected to light receiving parts of the first contact image sensor and the second contact image sensor, respectively.

5. The medium sensing apparatus of claim 4, wherein two adjacent first sensor grooves of the plurality of first sensor grooves are disposed axisymmetrically to each other, or
two adjacent second sensor grooves of the plurality of second sensor grooves are disposed axisymmetrically to each other.

6. The medium sensing apparatus of claim 1,
wherein, when the plurality of first contact image sensors and the plurality of second contact image sensors are transmissive contact image sensors where light is transmitted through a surface of the medium to sense the medium with a image where images of front and rear surfaces of the medium overlap with each other, one of the first and second contact image sensors comprises a light emitting part and the other of the first and second contact image sensors comprises a light receiving part disposed to face the light emitting part.

7. The medium sensing apparatus of claim 4, wherein one of the light emitting parts is disposed in one first sensor groove of the plurality of first sensor grooves, and one of the light receiving parts is disposed in one second sensor groove of the plurality of second sensor grooves overlapping with the one first sensor groove; and
another of the light receiving parts is disposed in another first sensor groove of the plurality of first sensor grooves, and another of the light emitting parts is disposed in another second sensor groove overlapping with the another first sensor groove.

8. The medium sensing apparatus of claim 1, wherein a reflective contact image sensor is disposed in one first sensor groove of the plurality of first sensor grooves, and the reflective contact image sensor is disposed in one second sensor groove overlapping with the one first sensor groove; and
a transmissive contact image sensor is disposed in another first sensor groove of the plurality of first sensor grooves, and a transmissive contact image sensor is disposed in another second sensor groove overlapping with the another first sensor groove.

9. A financial device comprising:
a main body;
a medium entrance through which a medium is put in and taken out, the medium entrance being provided at the main body;
a medium storage part to store the medium put through the medium entrance; and
a medium sensing apparatus comprising a single first frame and a single second frame to receive the medium, the single first frame and the single second frame disposed within the main body, the single first frame having a plurality of first sensor grooves above the medium to be received, wherein a first contact image sensor is insertable in each first sensor groove, the first contact image sensor being a reflective contact image sensor or a transmissive contact image sensor, and the single second frame having a plurality of second sensor grooves below the medium to be received, wherein a second contact image sensor is insertable in each second sensor groove, the second contact image sensor being the reflective contact image sensor or a transmissive contact image sensor;
wherein the plurality of the first sensor grooves are arranged to be spaced apart from each other in a transfer direction medium;
wherein the plurality of second sensor grooves are arranged to be spaced apart from each other in the transfer direction of the medium;
wherein the first contact image sensor is received in one first sensor groove of the plurality of first sensor grooves;
wherein the second contact image sensor is received in one second sensor groove of the plurality of second sensor grooves, and
wherein a distance between two adjacent first sensor grooves of the plurality of first sensor grooves is different from a distance between two adjacent second sensor grooves of the plurality of second sensor grooves.

10. The financial device of claim 9,
wherein each of the first and second contact image sensors comprises a transmissive contact image sensor sensing light transmitted through a surface of the medium to sense the medium with an image where images of front and rear surfaces of the medium overlap with each other and the transmissive contact image sensors are disposed to partially overlap with each other; and
wherein one of the first and second contact image sensors comprises a light emitting part and another of the first and second contact image sensors comprises a light receiving part disposed to face the light emitting part.

11. The financial device of claim 9, wherein contact image sensors of the first contact image sensor and the second contact image sensor comprise a plurality of contact image sensor types and are disposed in predetermined positions of the partially overlapped first sensor groove and second sensor groove, respectively; and
wherein different types of the contact image sensors are disposed in different predetermined positions.

12. The financial device of claim 9, wherein the first and second sensor grooves are disposed to partially overlap with each other; wherein each of the first and second contact image sensors comprises a reflective contact image sensor that reflects light from a surface of the medium to sense the medium with the reflected light; and
wherein each of the reflective contact image sensors comprises a light emitting part emitting light onto the surface of the medium and a light receiving part receiving light reflected by the surface of the medium, the light emitting parts of the first and second contact image sensors being disposed in a space between the light receiving part of the first contact image sensor and the light receiving part of the second contact image sensor.

13. The financial device of claim 9, wherein a portion of the single first frame having the plurality of first sensor grooves is symmetrically rotatable to a position of the single second frame having the plurality of second sensor grooves.

* * * * *